United States Patent
Blackmon et al.

(10) Patent No.: US 7,420,022 B2
(45) Date of Patent: Sep. 2, 2008

(54) POLYMERIZATION CATALYST SYSTEM UTILIZING EXTERNAL DONOR SYSTEMS AND PROCESSES OF FORMING POLYMERS THEREWITH

(75) Inventors: Kenneth P. Blackmon, Houston, TX (US); Shabbir A. Malbari, Pasadena, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 11/820,450

(22) Filed: Jun. 19, 2007

(65) Prior Publication Data

US 2007/0265403 A1 Nov. 15, 2007

Related U.S. Application Data

(60) Continuation-in-part of application No. 11/700,273, filed on Jan. 31, 2007, which is a division of application No. 11/243,390, filed on Oct. 4, 2005, now Pat. No. 7,202,191, which is a continuation of application No. 10/233,637, filed on Sep. 3, 2002, now Pat. No. 6,657,024.

(51) Int. Cl.
C08F 4/42 (2006.01)

(52) U.S. Cl. .................... 526/128; 526/348; 526/124.3; 526/124.9; 526/348.1; 502/116; 502/103; 556/470

(58) Field of Classification Search ................. 526/348, 526/128, 124.3, 124.9, 348.1; 502/116, 103; 556/470

See application file for complete search history.

(56) References Cited

U.S. PATENT DOCUMENTS 6,133,385 A * 10/2000 Shamshoum et al. ........ 526/128
2002/0119888 A1 * 8/2002 Miro .......................... 502/103

* cited by examiner

*Primary Examiner*—Ling-Siu Choi
(74) *Attorney, Agent, or Firm*—Diane L. Kilpatrick-Lee

(57) ABSTRACT

External donor systems, catalyst systems and olefin polymerization processes are described herein. The external donor systems generally include a first external donor represented by the general formula $SiR^2_m(OR^3)_{4-m}$, wherein each $R^2$ is independently selected from alkyls, cycloalkyls, aryls and vinyls, each $R^3$ is independently selected from alkyls and m is from 0 to 4. The external donor systems further include a second external donor represented by the general formula $SiR^4_m(OR^5)_{4-m}$, wherein each $R^4$ is independently selected from alkyls, cycloalkyls, aryls and vinyls, each $R^5$ is independently selected from alkyls, m is from 0 to 4 and at least one $R^4$ is a $C_3$ or greater alkyl.

10 Claims, 3 Drawing Sheets

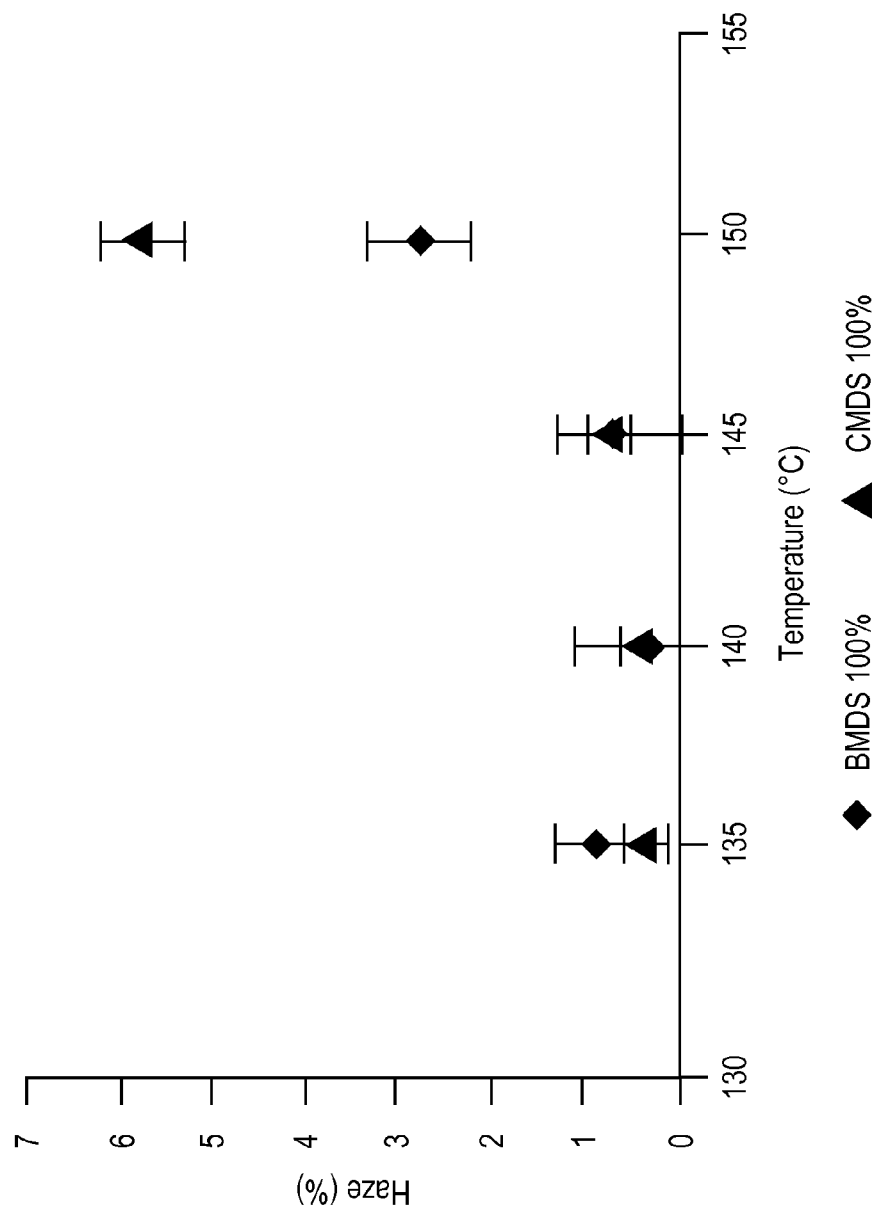

POLYMERIZATION CATALYST SYSTEM UTILIZING EXTERNAL DONOR SYSTEMS AND PROCESSES OF FORMING POLYMERS THEREWITH

CROSS-REFERENCE TO RELATED APPLICATIONS

This application claims the benefit of U.S. patent application Ser. No. 11/700,273, filed Jan. 31, 2007, which claims the benefit of U.S. patent application Ser. No. 11/243,390, filed Oct. 4, 2005, which claims the benefit of U.S. Pat. No. 7,109,143, filed Sep. 10, 2003, which claims the benefit of U.S. Pat. No. 6,657,024, filed Sep. 3, 2002.

FIELD

Embodiments of the present invention generally relate to processes for forming polyolefins and the catalyst systems utilized therefore. In particular, embodiments of the present invention relate to external donor systems utilized in the catalyst systems.

BACKGROUND

As reflected in the patent literature, efforts have been made to modify the molecular weight distribution and/or the microtacticity of polyolefins, such as polypropylene, to increase the processability thereof. Prior attempts have included utilizing high cost catalyst donors. Unfortunately, such donors have generally resulted in lower catalyst activities, thereby further increasing the process costs.

Therefore, a need exists to increase the processability of polyolefins while minimizing the process costs thereof.

SUMMARY

Embodiments of the present invention include external donor systems for catalyst systems for olefin polymerization. The external donor systems generally include a first external donor represented by the general formula $SiR^2_m(OR^3)_{4-m}$, wherein each $R^2$ is independently selected from alkyls, cycloalkyls, aryls and vinyls, each $R^3$ is independently selected from alkyls and m is from 0 to 4. The external donor systems further include a second external donor represented by the general formula $SiR^4_m(OR^5)_{4-m}$, wherein each $R^4$ is independently selected from alkyls, cycloalkyls, aryls and vinyls, each $R^5$ is independently selected from alkyls, m is from 0 to 4 and at least one $R^4$ is a $C_3$ or greater alkyl.

In one specific embodiment, at least one $R^2$ is a cycloalkyl.

Embodiments further include catalyst systems and polymerization processes. The catalyst systems generally include a Ziegler-Natta catalyst component represented by the general formula $MR^1_x$ wherein M is a transition metal, $R^1$ is a halogen, an alkoxy, or a hydrocarboxyl group and x is the valence of the transition metal. The catalyst systems further include a co-catalyst component including an organoaluminum compound and the external donor system. The polymerization processes generally include contacting the catalyst system with an olefin monomer to form a polyolefin.

BRIEF DESCRIPTION OF DRAWINGS

FIG. 3 illustrates that haze of various samples as a result of temperature.

DETAILED DESCRIPTION

Introduction and Definitions

Figure 1:
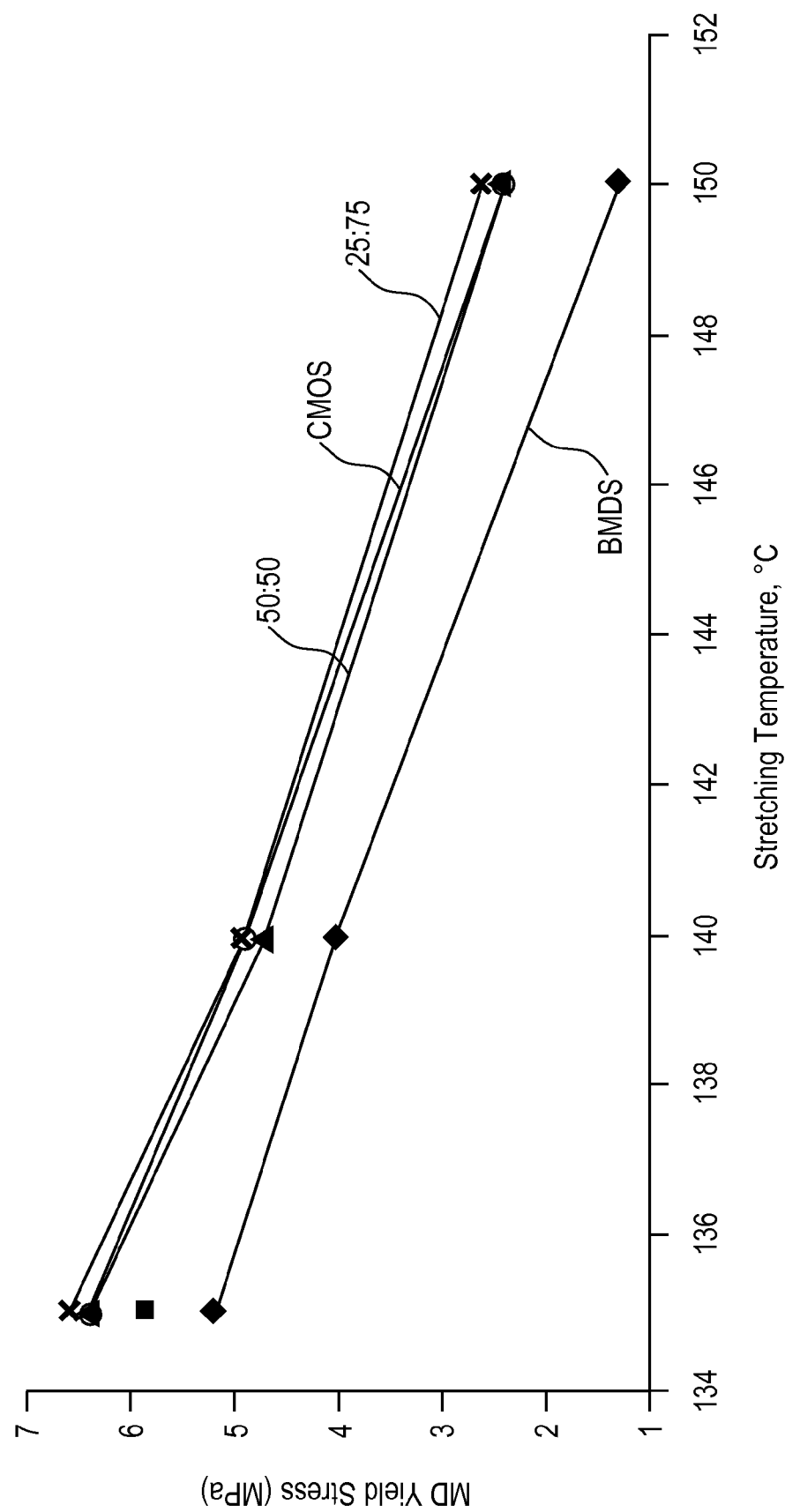
FIG. 1 illustrates the yield stress of various samples as a result of stretching temperature.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents at the time of filing. Further, unless otherwise specified, all compounds described herein may be substituted or unsubstituted and the listing of compounds includes derivatives thereof.

Various ranges are further recited below. It should be recognized that unless stated otherwise, it is intended that the endpoints are to be interchangeable. Further, any point within that range is contemplated as being disclosed herein.

The term "activity" refers to the weight of product produced per weight of the catalyst used in a process at a standard set of conditions per unit time.

As used herein, the term "activator" is defined to be any compound or combination of compounds, supported or unsupported, which may enhance the activity and/or productivity of a catalyst compound. Further, the term activator may be used interchangeably with the term cocatalyst herein.

As used herein, the term "crystallinity" refers to a measurement on the crystalline fraction of a polymer as measured by $^{13}CNMR$.

Catalyst Systems

Catalyst systems useful for polymerizing olefin monomers include catalyst systems known to one skilled in the art, such as Ziegler-Natta catalyst systems, for example. A brief discussion of such catalyst systems is included below, but is in no way intended to limit the scope of the invention to such catalysts.

Ziegler-Natta catalyst systems are generally formed from the combination of a metal component (e.g., a catalyst) with one or more additional components, such as a catalyst support, a cocatalyst and/or one or more electron donors, for example.

A specific example of a Ziegler-Natta catalyst includes a metal component generally represented by the formula:

wherein M is a transition metal, R is a halogen, an alkoxy, or a hydrocarboxyl group and x is the valence of the transition metal. For example, x may be from 1 to 4.

The transition metal may be selected from Groups IVB through VIB (e.g., titanium, chromium or vanadium), for example. R may be selected from chlorine, bromine, carbonates, esters, or alkoxy groups in one embodiment. Examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$, for example.

Those skilled in the art will recognize that a catalyst may be "activated" in some way before it is useful for promoting polymerization. As discussed further below, activation may be accomplished by contacting the catalyst with an activator. The activators may include any activators known to one skilled in the art including organoaluminum compounds, such as trimethyl aluminum (TMA), triethyl aluminum (TEAl) and triisobutyl aluminum (TiBAl), for example.

The Ziegler-Natta catalyst system may further include one or more electron donors, which may be used to reduce the atactic form of the resulting polymer, thus altering the amount of xylene solubles in the polymer, for example. The internal electron donors may include amines, amides, esters, ketones, nitriles, ethers, thioethers, thioesters, aldehydes, alcoholates, salts, organic acids, phosphines, diethers, succinates, phthalates, malonates, maleic acid derivates, dialkoxybenzenes or combinations thereof, for example. (See, U.S. Pat. No. 5,945, 366 and U.S. Pat. No. 6,399,837, which are incorporated by reference herein.)

Traditional external electron donors have included Lewis bases, such as organosilicon compounds having the general formula $SiR_m(OR')_{4-m}$, wherein R is independently selected from alkyls, cycloalkyls, aryls or vinyls, R' is an alkyl, which may be the same or different and m is 0 to 4. For example, the external electron donors may include monofunctional or polyfunctional carboxylic acids, carboxylic anhydrides, carboxylic esters, ketones, ethers, alcohols, lactones, organophosphorus compounds and/or organosilicon compounds. For example, the external donor may include diphenyldimethoxysilane (DPMS), cyclohexylmethyldimethoxysilane (CMDS), diisopropyldimethoxysilane (DIDS) and/or dicyclopentyldimethoxysilane (CPDS), for example. The external donor may be the same or different from the internal electron donor used.

While generally resulting in acceptable catalyst activity, traditional external donors, such as CPDS, generally form high crystallinity polymers (e.g., polypropylene having a meso pentad greater than about 95%). While high crystallinity polymers may be desirable, such high crystallinity may provide processability problems for certain applications, such as biaxial oriented film production (BOPP).

Therefore, embodiments of the invention include utilizing a donor capable of providing a polymer with decreased microtacticity (e.g., a polymer exhibiting a meso pentad of less than about 95%, or less than about 94% or less than about 93%). For example, the external donor may include a donor having the general formula $SiR_m(OR')_{4-m}$, wherein each R' is independently selected from alkyls, cycloalkyls, aryls or vinyls, R' is an alkyl, wherein each R' may be the same or different and m is 0 to 4. In one specific embodiment, at least one R is a $C_3$ or greater alkyl. In one specific embodiment, the external donor includes butylmethyldimethoxysilane (BMDS).

Such efforts have resulted in desirable processability increases (evidenced by decreased microtacticity) while maintaining desirable melt flow and xylene solubles levels for certain applications. See, U.S. Pat. No. 6,657,024, which is incorporated by reference herein. However, BMDS is a costly external donor both in commodity cost and further in significantly lower catalyst activity than the traditional donors discussed herein.

Therefore, one or more embodiments of the invention include external electron donor systems utilizing the donor capable of providing a polymer with decreased microtacticity, as described above. The external electron donor systems include at least a first external donor and a second external donor. While it is contemplated that additional external donors may be utilized in the external donor system, only the first and second external donors will be discussed in detail herein.

The catalyst system may include from about 0.5 parts per million (ppm) to about 500 ppm, or from about 2 ppm to about 200 ppm or from about 4 ppm to about 50 ppm external donor system (based on the weight of monomer), for example.

In one embodiment, the catalyst system includes an Al:Si molar ratio (organoaluminum activator to silane donor) of from about 0.5 to about 500, or from about 1 to about 200 or from about 2 to about 100, or from about 5 to 50 or from about 10 to 40, for example.

The first external donor may include any of the traditional external donors described above. For example, the first external donor may include a traditional silane external donor. In one embodiment, the first external donor may include a donor having the general formula $SiR_m(OR')_{4-m}$, wherein each R is independently selected from alkyls, cycloalkyls, aryls or vinyls, R' is an alkyl and each R' may be the same or different and m is 0 to 4. In one specific embodiment, at least one R is a cycloalkyl. In one specific embodiment, the first external donor includes CMDS, for example. It is understood that in a mixture of external donor molecules, one of the compounds may play a stronger role in stereoregulation of monomer insertion due to its specific complexation attributes with the catalyst active sites (e.g., one of the external donors may perform in a dominant fashion with respect to microtacticity control). Therefore, the selection of the first external donor may take the dominance of the donor within the external donor system into consideration. Such dominancy may affect the amount of second donor necessary to obtain adequate reduction in polymer microtacticity for processability control (as may be evidenced by stretching).

The second external donor generally includes a donor capable of providing a polymer with decreased microtacticity (e.g., a polymer exhibiting a meso pentad of less than about 95%, or less than about 94% or less than about 93%). For example, the second external donor may include a donor having the general formula $SiR_m(OR')_{4-m}$, wherein each R is independently selected from alkyls, cycloalkyls, aryls or vinyls, R' is an alkyl, wherein each R' may be the same or different and m is 0 to 4. In one specific embodiment, at least one R is a $C_3$ or greater alkyl. In one embodiment, the second external donor includes BMDS.

The external donor system may include from about 10 mol. % to about 90 mol. %, or from about 20 mol. % to about 75 mol. %, or from about 25 mol. % to about 70 mol. %, or from about 30 mol. % to about 65 mol. %, or from about 40 mol. % to about 80 mol. %, or from about 35 mol. % to about 60 mol. %, or from about 40 mol. % to about 55 mol. % or from about 45 mol. % to about 50 mol. % second external donor, for example.

In one embodiment, the external donor system includes the first external donor in a molar ratio to the second external donor of about 75:25, or from about 50:50 or from about 25:75, for example. In one specific embodiment, the external donor system includes the first external donor and the second external donor in equal amounts (based on a molar basis). In one specific embodiment, the external donor system includes more second external donor than first external donor (on a molar basis).

It has been observed that by varying the ratio of second external donor to the first external donor, properties of the polymer and therein the resulting polymer article (such as microtacticity and as a result, stretchability) can be controlled.

The components of the Ziegler-Natta catalyst system (e.g., catalyst, activator and/or electron donors) may or may not be associated with a support, either in combination with each other or separate from one another. The Ziegler-Natta support materials may include a magnesium compound, such as magnesium dichloride, magnesium dibromide, dialkoxymagnesiums, alkoxymagnesium halids, magnesium oxyhalides, dialkylmangesiums, magnesium oxide, magnesium hydroxide and carboxylates of magneisum or a silica compound, for example.

The Ziegler-Natta catalyst may be formed by any method known to one skilled in the art. For example, the Ziegler-Natta catalyst may be formed by contacting a transition metal halide with a metal alkyl or metal hydride. (See, U.S. Pat. No. 4,298,718, U.S. Pat. No. 4,298,718, U.S. Pat. No. 4,544,717, U.S. Pat. No. 4,767,735, and U.S. Pat. No. 4,544,717, which are incorporated by reference herein.)

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. The monomers may include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes may include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any method known to one skilled in the art, such as via a double-jacketed pipe or heat exchanger, for example.

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

It has been observed that embodiments of the invention result in the ability to control polymer microtacticity while experiencing unexpected benefits in catalyst activity. For example, in a specific embodiment, catalyst activities within about 30%, or 20%, or 15%, or 10% or 5% of processes utilizing a single external donor are possible. In one specific embodiment, the catalyst activities are greater than those utilizing a single external donor. For example, in a specific embodiment of propylene polymerization, the catalyst may exhibit an activity of from about 25,000 g/g/hr to about 50,000 g/g/hr, or from about 30,000 g/g/hr to about 45,000 g/g/hr or from about 35,000 g/g/hr to about 40,000 g/g/hr, for example.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene and polypropylene copolymers, for example.

Unless otherwise specified, the terms "propylene polymer" or "polypropylene" refers to propylene homopolymers or those polymers composed primarily of propylene and limited amounts of other comonomers, such as ethylene, wherein the comonomer make up less than about 2 wt. % (e.g., mini random copolymers), or less than about 0.5 wt. % or less than about 0.1 wt. % by weight of polymer.

As used herein, the term "stereospecific polymer" refers to a polymer having a defined arrangement of molecules in space, such as isotactic and syndiotactic polypropylene, for example. The term "tacticity" refers to the spatial arrangement of pendant groups in a polymer. For example, a polymer is "atactic" when its pendant groups are arranged in a random fashion on both sides of a hypothetical plane through the main chain of the polymer. In contrast, a polymer is "isotactic" when all its pendant groups are arranged on the same side of the chain and "syndiotactic" when its pendant groups alternate on opposite sides of the chain. The tacticity of a polymer may be analyzed via NMR spectroscopy, wherein "mmmm" (meso pentad) designates isotactic units and "rrrr" (racemic pentad) designates syndiotactic units.

In one embodiment, the propylene polymer has a microtacticity (isotacticity) of from about 89% to about 95%, or from about 91% to about 94% or from about 91% to about 93%, for example.

In one embodiment, the propylene polymer has a xylene solubles level of less than about 6 wt. %, or from about 1 wt. % to about 5 wt. %, or from about 3 wt. % to about 5 wt. % or from about 2 wt. % to about 5 wt. %, for example.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include melt spinning, solution spinning and melt blown fiber operations for use in woven or non-woven form to make filters, diaper fabrics, medical garments and geotextiles, for example. Extruded articles include medical tubing, wire and cable coatings, geomembranes and pond liners, for example. Molded articles include single and multi-layered constructions in the form of bottles, tanks, large hollow articles, rigid food containers and toys, for example.

In one embodiment, the polymers are useful to form biaxially oriented polypropylene (BOPP) films. As discussed previously, the polymers formed by the embodiments described herein generally result in polymers having lower tacticities than polymers formed with traditional external donors. Therefore, it is expected that such polymers are capable of forming BOPP films that exhibit improved properties, such as stretchability (e.g., require lower stretching forces). Increased stretchability generally results in films that may be heated faster to give similar properties and higher throughputs, such as at least about 300 to 500 m/min. The BOPP films may include tenter frame, simultaneous orientation, tubular and double bubble processes, for example.

In one embodiment the BOPP films exhibited improved gloss and haze.

In another embodiment, the polymers are useful to form injection molded articles. In one embodiment, the polymers are useful to form opaque articles. In one embodiment, the polymers are useful in film thermoforming. In one embodiment, the polymers are useful in stretch blow molding and sheet extrusion.

EXAMPLES

Samples of polypropylene were produced at varying external donor and Al:Si levels analyzed.

As used herein, "BMDS" refers to n-butyl methyl dimethoxy silane.

The term "CMDS" refers to cyclohexymethyldimethoxysilane.

The term "TEAL" refers to triethyl aluminum.

The catalyst used in the examples herein is a commercially available Ziegler-Natta catalyst THC A-021 available from TOHO Titanium.

Unless otherwise designated herein, all testing methods are the current methods at the time of filing.

The xylene solubles level is generally a measure of the degree of stereoselectivity of the polymer and is measured by dissolving the polymer in hot xylene, cooling the solution and precipitating out the crystalline material. The xylene solubles level is the wt. % of the polymer that was soluble in the cold xylene.

In all runs, 10 mg of the Ziegler-Natta catalyst was contacted with external donor to form Ziegler-Natta catalyst systems. Such catalyst systems were then contacted with propylene monomer in the presence of 1 mmol TEAL co-catalyst to form polypropylene (rxn. temperature 77° C., rxn. time 1 hr., in-situ polymerization, about 0.05 mol % $H_2$), which was then analyzed. The results of such polymerizations are shown in Table 1 below.

TABLE 1

| Run | External Donor | Mixture Molar Ratio | Al:Si Molar Ratio | Activity (g/g/hr) | Xylene Solubles (wt. %) | Melt Flow (g/10 min) | Mn | Mw | Mz | Mw/Mn |
|---|---|---|---|---|---|---|---|---|---|---|
| 1 | BMDS | N/A | 5 | 19,000 | 2.5 | 3.2 | 80,300 | 446,000 | 2,370,000 | 5.6 |
| 2 | BMDS | N/A | 10 | 20,900 | 3.0 | — | — | — | — | — |
| 3 | BMDS | N/A | 20 | 25,200 | 3.4 | 2.4 | 65,300 | 474,000 | 2,370,000 | 7.3 |
| 4 | BMDS/CMDS | 75:25 | 10 | 30,400 | 1.9 | — | — | — | — | — |
| 5 | BMDS/CMDS | 75:25 | 15 | 37,000 | 3.8 | 4.9 | 61,400 | 454,000 | 2,280,000 | 7.4 |
| 6 | BMDS/CMDS | 75:25 | 20 | 40,000 | 4.7 | — | — | — | — | — |

TABLE 1-continued

| Run | External Donor | Mixture Molar Ratio | Al:Si Molar Ratio | Activity (g/g/hr) | Xylene Solubles (wt. %) | Melt Flow (g/10 min) | Mn | Mw | Mz | Mw/Mn |
|---|---|---|---|---|---|---|---|---|---|---|
| 7 | BMDS/CMDS | 75:25 | 25 | 39,000 | 4.9 | — | — | — | — | — |
| 8 | BMDS/CMDS | 50:50 | 10 | 33,000 | 2.3 | — | — | — | — | — |
| 9 | BMDS/CMDS | 50:50 | 15 | 37,200 | 3.1 | — | — | — | — | — |
| 10 | BMDS/CMDS | 50:50 | 25 | 40,000 | 4.1 | 2.9 | 69,300 | 4446,000 | 1,730,000 | 6.4 |
| 11 | BMDS/CMDS | 50:50 | 30 | 39,000 | 5.3 | — | — | — | — | — |
| 12 | BMDS/CMDS | 25:75 | 10 | 34,200 | 1.9 | — | — | — | — | — |
| 13 | BMDS/CMDS | 25:75 | 20 | 37,000 | 4.0 | 1.9 | 68,700 | 431,000 | 1,700,000 | 6.3 |
| 14 | BMDS/CMDS | 25:75 | 30 | 34,500 | 5.1 | — | — | — | — | — |
| 15 | BMDS/CMDS | 25:75 | 40 | 39,600 | 5.5 | — | — | — | — | — |
| 16 | CMDS | N/A | 40 | 43,000 | 3.3 | 2.9 | 54,200 | 414,000 | 1,800,000 | 7.6 |

*melt flow was measured by ASTM D1238-95, molecular weights measured by GPC

It was observed that the activity significantly increased for catalyst systems prepared with mixtures of external donors over BMDS catalyst systems, while the mixed donor catalyst systems achieved activities near that of CMDS systems (e.g., within about 10%). It was further observed that the activity increased with an increase in Al:Si ratio.

It was further observed that the xylene solubles level also increased with an increase in the Al:Si ratio. However, the mixture resulted in a lower desirable xylene solubles level at the same Al:Si molar ratio than the BMDS system, thereby allowing for less donor to be used (cost savings).

Further, the mixed donor catalyst systems resulted in slightly narrower molecular weight distributions than that of the CMDS donor catalyst system.

It is further anticipated that polymers having reduced stereoregularity will provide increased BOPP film processability (e.g., faster line speeds) due to the lower stretching force required. Table 2 below illustrates microtacticity (of the xylene insoluble portion) results of the polymerization runs.

TABLE 2

| | Run # | | | | |
|---|---|---|---|---|---|
| | 16 | 1 | 5 | 10 | 13 |
| mmmm | 94.2 | 92.5 | 93.1 | 92.7 | 93.2 |
| mmmr | 1.9 | 2.4 | 2.0 | 2.3 | 2.1 |
| rmmr | 0.3 | 0.3 | 0.2 | 0.4 | 0.3 |
| mmrr | 1.6 | 2.3 | 2.2 | 2.1 | 1.9 |
| mmrm + rmrr | 0.4 | 0.4 | 0.5 | 0.5 | 0.6 |
| mrmr | 0.2 | 0.2 | 0.2 | 0.2 | 0.2 |
| rrrr | 0.3 | 0.4 | 0.4 | 0.4 | 0.4 |
| rrrm | 0.3 | 0.3 | 0.4 | 0.4 | 0.4 |
| mrrm | 0.8 | 1.1 | 1.0 | 1.0 | 0.9 |

It was observed that while the sample prepared with BMDS had the lowest meso pentad, the samples prepared with mixed donor systems exhibited lower stereoregularity than the CMDS prepared system.

The polymers were further analyzed for film properties. The polymers were cast into 16 mil sheets. The 16 mil sheets were then stretched biaxially at 135° C., 140° C. and 150° C. to 6×6 a real draw ratio on a Bruckner lab stretcher. The machine and transverse direction speeds were each 30 m/min. The preheating time was set at 30 seconds. The results are shown in Table 3 below.

TABLE 3

| Run | Gloss (45°) | Haze (%) | MD Shrinkage (125° C.) | TD Shrinkage (125° C.) | WVTR (g/100 in²/day) | 1% Secant Modulus (kpsi) | Yield/break strength (kpsi) | Elongation at yield/break(%) |
|---|---|---|---|---|---|---|---|---|
| 3 | 92 | 0.6 | 12.2 | 12.5 | 0.74 | 305 | 23.9 | 50.7 |
| 10 | 88.2 | 0.9 | 13.5 | 13.5 | 0.71 | 325 | 30.5 | 65.5 |
| 13 | 91.5 | 0.8 | 12.0 | 13.5 | 0.64 | 319 | 30.2 | 66.4 |
| 16 | 93.3 | 0.4 | 13.5 | 13.5 | 0.77 | 331 | 29.2 | 72.8 |

Figure 2:
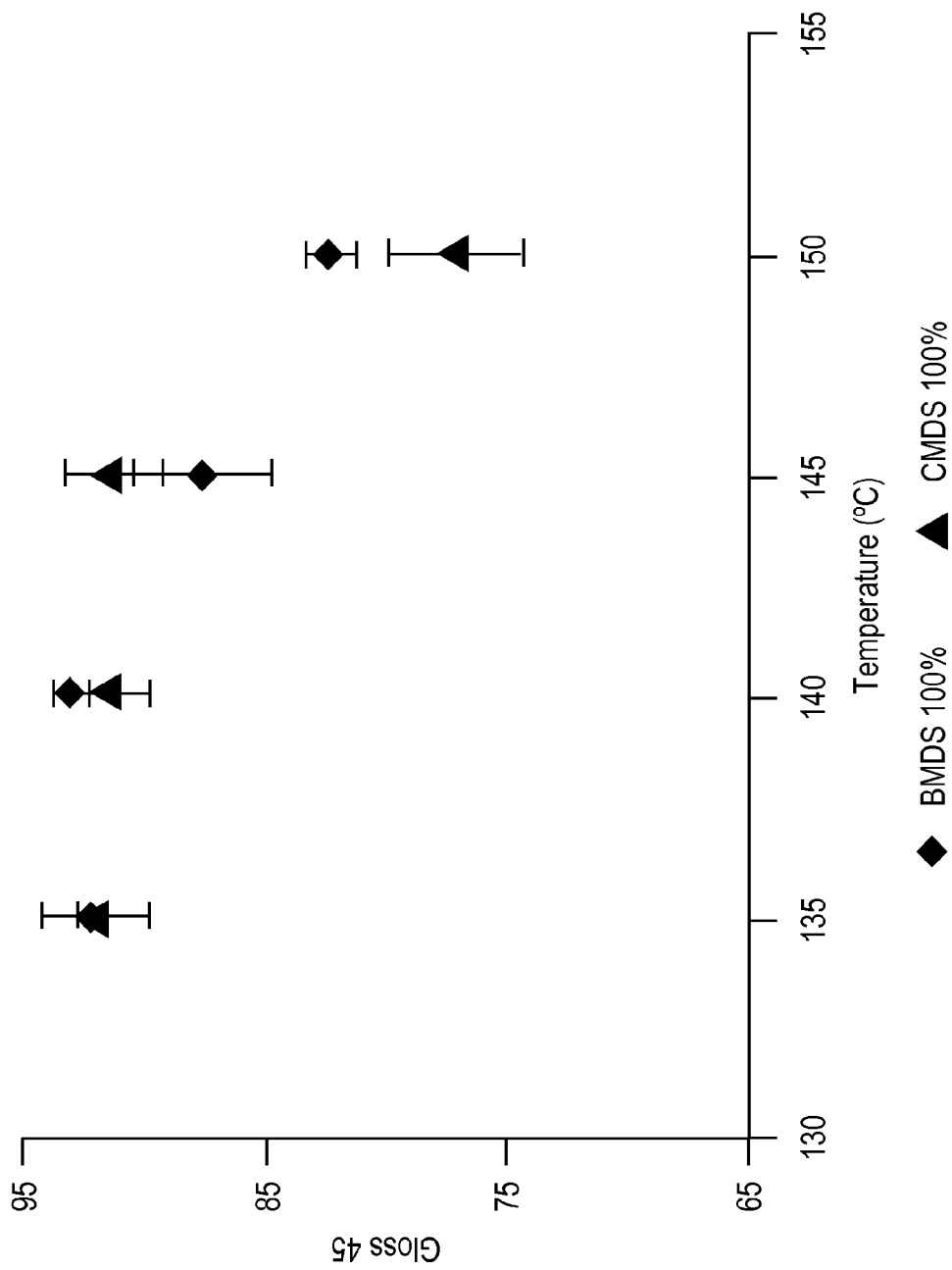
FIG. 2 illustrates the gloss of various samples as a result of temperature.

It was observed that at lower stretch temperatures (below 145° C.), the BOPP films appeared comparable. However, at higher stretch temperatures (e.g., 150° C. or above), the BMDS based BOPP appeared improved in surface gloss and haze. See, FIGS. 1, 2 and 3.

While the foregoing is directed to embodiments of the present invention, other and further embodiments of the invention may be devised without departing from the basic scope thereof and the scope thereof is determined by the claims that follow.

What is claimed is:

1. A catalyst system for polymerizing olefins comprising:
    a Ziegler-Natta catalyst component represented by the general formula $MR^1_x$ wherein M is a transition metal, $R^1$ is a halogen, an alkoxy, or a hydrocarboxyl group and x is the valence of the transition metal;
    a co-catalyst component comprising an organoaluminum compound; and
    an external donor system comprising:
        a first external donor, wherein the first external donor comprises cyclohexylmethyldimethoxysilane (CMDS); and
        a second external donor, wherein the first external donor comprises butylmethyldimethoxysilane (BMDS).

2. The catalyst system of claim 1, wherein at least one $R^2$ is a cycloalkyl.

3. The catalyst system of claim 1 further comprising an Al:Si molar ratio of 5:1 to 40:1.

4. The catalyst system of claim 1, wherein the external donor system comprises from about 25 mol. % to about 80 mol. % second external donor.

5. An olefin polymerization process comprising;
providing a Ziegler-Natta catalyst component represented by the general formula $MR^1_x$ wherein M is a transition metal, each $R^1$ is independently selected from halogens, alkoxys and hydrocarboxyl groups and x is the valence of the transition metal;
contacting the Ziegler-Natta catalyst component with a co-catalyst component comprising an organoaluminum compound and an external donor system to form a catalyst system, wherein the external donor system comprises:
a first external donor, wherein the first external donor comprises cyclohexylmethyldimethoxysilane (CMDS); and
a second external donor, wherein the first external donor comprises butylmethyldimethoxysilane (BMDS);
contacting an olefin monomer with the catalyst system within a reaction zone to form a polyolefin.

6. The process of claim 5 further comprising an Al:Si molar ratio of 5:1 to 40:1.

7. The process of claim 5, wherein the external donor system comprises from about 25 mol. % to about 80 mol. % second external donor.

8. The process of claim 5, wherein the polyolefin exhibits a microtacticity of about 95% or less.

9. The process of claim 5, wherein the polyolefin comprises a xylene solubles level of less than about 6 wt. %.

10. The process of claim 5, wherein the catalyst activity is within about 30% of the catalyst activity of an identical process absent the second external donor.

\* \* \* \* \*